United States Patent [19]

Moriya et al.

[11] 4,420,173

[45] Dec. 13, 1983

[54] AUTOMATIC SEATBELT SYSTEM

[75] Inventors: Shigeru Moriya; Akio Yosida, both of Toyota; Yoshihiro Hayashi, Kasugai; Tatsushi Kubota, Okazaki; Mitsuaki Katsuno, Toyota, all of Japan

[73] Assignees: Toyota Jidosha Kogyo Kabushiki Kaisha; Kabushiki Kaisha Tokai-Rika-Denki-Seisakusho, both of Aichi, Japan

[21] Appl. No.: 300,104

[22] Filed: Sep. 8, 1981

[30] Foreign Application Priority Data

Sep. 24, 1980 [JP] Japan .................. 55-135707[U]

[51] Int. Cl.³ .................................... B60R 21/10
[52] U.S. Cl. ............................................ 280/804
[58] Field of Search ................................ 280/804

[56] References Cited

U.S. PATENT DOCUMENTS

| 3,995,884 | 12/1976 | Bauer et al. | 280/804 |
| 4,268,068 | 5/1981 | Suzuki et al. | 280/804 |
| 4,274,657 | 6/1981 | Johnson et al. | 280/803 |
| 4,277,088 | 7/1981 | Suzuki et al. | 280/804 |
| 4,284,294 | 8/1981 | Takada | 280/804 |

FOREIGN PATENT DOCUMENTS

| 55-39827 | 3/1980 | Japan | 280/804 |
| 55-123542 | 9/1980 | Japan | 280/804 |

Primary Examiner—Robert R. Song
Attorney, Agent, or Firm—Parkhurst & Oliff

[57] ABSTRACT

An automatic seatbelt system which has a flexible tape extending continuously along a vehicle body form a roof side portion through a center pillar to a door so as to move a shoulder webbing connected to the roof side portion and a lap webbing connected to the door at the same time by a single driving sprocket wheel in response to an occupant entering or leaving a vehicle. The tape has a plurality of openings along the longitudinal direction thereof and the sprocket wheel is meshed with the tape by the openings. The tape extends continuously between the vehicle body and vehicle door and has a stepped portion substantially extending in a vertical direction, for example, a direction which is aligned with the rotation center of door hinges so as to twist itself around the longitudinal center thereof during opening or closing the door. When the sprocket wheel rotates, both shoulder and lap seatbelt webbings are simultaneously moved through the tape toward either the front side of the vehicle to provide an enough space for the occupant to enter the vehicle, or the rear side of the vehicle to place the webbings over the occupant at a seat.

21 Claims, 22 Drawing Figures

AUTOMATIC SEATBELT SYSTEM

BACKGROUND OF THE INVENTION

1. Field of the Invention

This invention relates to an automatic seatbelt system, and more particularly to an automatically fastening seatbelt system for automatically fastening webbings about an occupant in an emergency of a vehicle.

2. Description of the Prior Art

Heretofore, there has been proposed an automatically fastening seatbelt system for automatically fastening webbings about an occupant of such a type that occupant restraining webbings are moved along a vehicle body by an electric motor or the like upon detecting an occupant in the seat, so that the webbing is fastened without any operation by the occupant. This type of automatic webbing fastening seatbelt system has been highly evaluated because long strokes of webbing can be obtained without any handling by the occupant.

However, in this conventional automatically fastening seatbelt system, in order to automatically bring the occupant into a three-point fastened state, it has been necessary to provide at least two electric motors per occupant, namely four electric motors for front seats for moving shoulder webbings and lap webbings, resulting in raised manufacture costs, increased weight and reduced compartment space. When only one motor has been used in the conventional system, either a shoulder webbing or a lap webbing is moved, thus causing a hindrance to comfortable and smooth webbing fastening action for the occupant due to the other webbing not moved by the motor.

SUMMARY OF THE INVENTION

The present invention has been developed to obviate the above-described disadvantage of the prior art and has as its object the provision of an automatically fastening seatbelt system in which both a shoulder webbing and a lap webbing are driven by a single electric motor, thereby enabling automatic fastening of the webbings about an occupant.

It is another object of the present invention to provide an automatic seatbelt system in which a driving force from a single motor moving both webbings is transmitted by a transmitting member extending from a vehicle body to a door, which member compensates for changes of distance between the vehicle body and door without any interruption of smooth moving thereof.

To achieve the above objects, the automatic seatbelt system according to the present invention includes a flexible transmitting means such as a flexible tape for transmitting a driving force from a single driving means for rotating a reversibly rotatable sprocket wheel to a guide member guiding an end portion of a seatbelt webbing so as to move the webbing back and forth in the longitudinal direction of the vehicle. The guide member is provided on a vehicle body or vehicle door. The sprocket wheel is provided on the vehicle door or vehicle body where the guide member is not provided. The transmitting means extends continuously between the vehicle body and vehicle door and has a stepped portion substantially extending in a vertical direction. The stepped portion is adapted for twisting around the longitudinal center thereof during opening or closing of the door.

DETAILED DESCRIPTION OF THE PREFERRED EMBODIMENT

Figure 1:
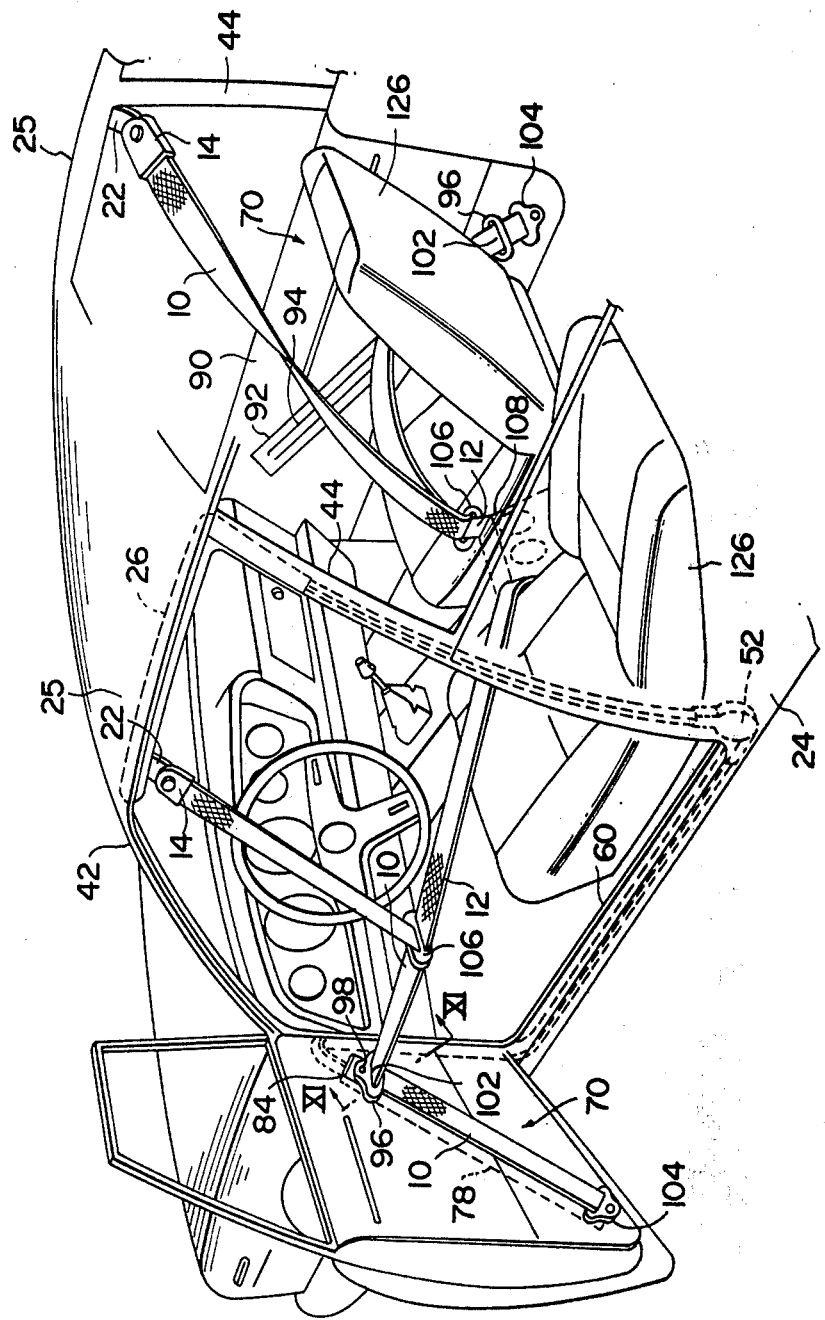
FIG. 1 is a perspective view showing a first embodiment of the automatically fastening seatbelt system according to the present invention.
Figure 2:
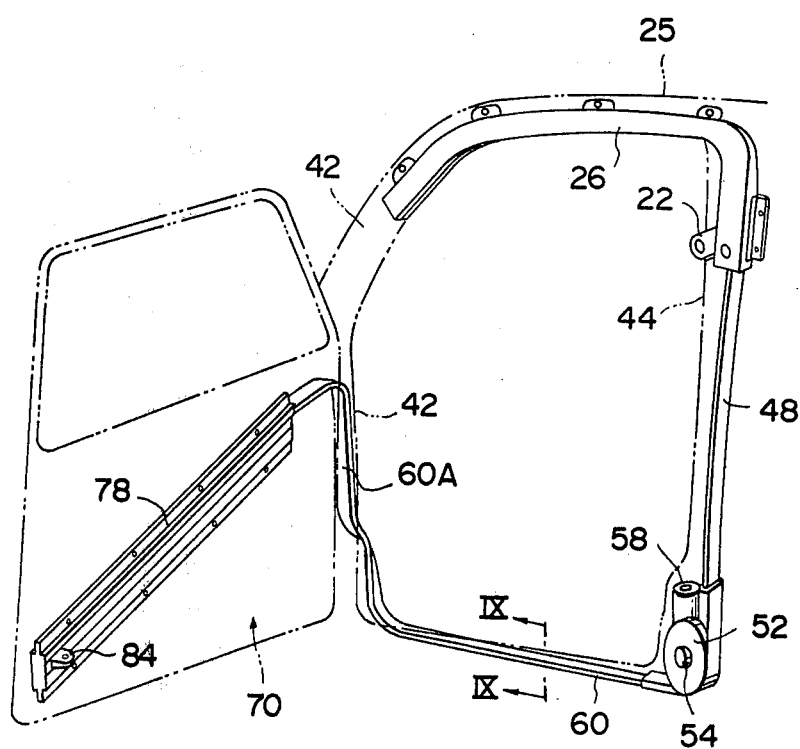
FIG. 2 is a perspective view showing only the essential portions of FIG. 1.

Description will hereunder be given of the embodiments of the present invention. FIGS. 1 and 2 show the first embodiment of the seatbelt system according to the present invention, in which an occupant is automatically brought into a three-point webbing fastened state by use of an outer webbing 10 and an inner webbing 12.

Figure 4:
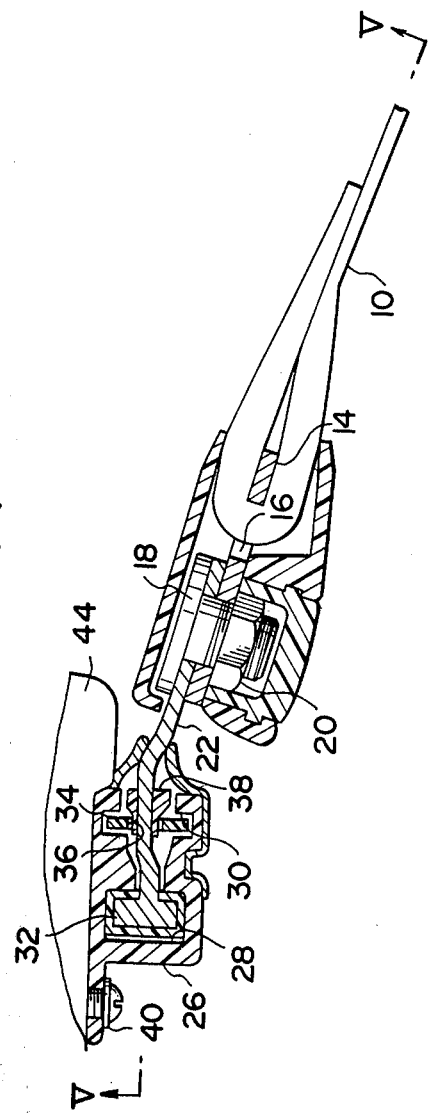
FIG. 4 is a sectional view taken along the line IV—IV in FIG. 3.

As shown in FIG. 4, one end of the outer webbing 10 is turned back at an opening 16 of a shoulder anchor 14, and then, sewn to itself. This shoulder anchor 14 is solidly secured to a shoulder guide member or shoulder guide plate 22 by means of a bolt 18 and a nut 20. It is preferable that this shoulder anchor 14 is rotatable about the bolt 18.

This shoulder guide plate 22 is adapted to move in the longitudinal direction of the vehicle, being guided by a shoulder guide rail 26 laid along a roof side 25 of the vehicle body in the longitudinal direction of the vehicle.

Figure 6:
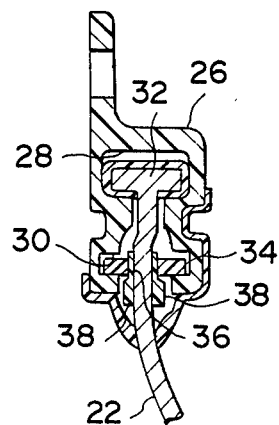
FIG. 6 is a sectional view taken along the line VI—VI in FIG. 3.

Detailed description will now be given of the relationship between this shoulder guide plate 22 and the shoulder guide rail 26. As shown in FIG. 6, the shoulder guide rail 26 has substantially a U-shaped cross section in the longitudinal direction and is provided therein with an anchor groove 28 and a slide groove 30, which are substantially in parallel to each other. These anchor groove 28 and slide groove 30 are formed over the entire length of the shoulder guide rail 26 in the longitudinal direction thereof, and an enlarged head 32 of the shoulder guide plate 22 is disposed in the anchor groove 28. This enlarged head 32 is adapted to prevent the shoulder guide plate 22 from falling off the shoulder guide rail 26 in a collision of the vehicle.

Figure 7:
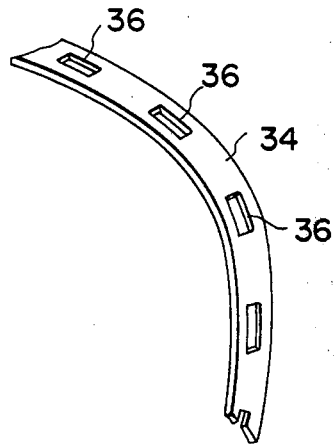
FIG. 7 is a perspective view showing the flexible tape used in this embodiment.

A flexible tape 34 shown in FIG. 7 is received in the slide groove 30 and adapted to slide on the shoulder guide rail 26 in the longitudinal direction thereof. This flexible tape 34 is a relatively thick wall tape made of a synthetic resin material and capable of imparting both a tensile force and a compressive force in the slide groove 30 in the longitudinal direction thereof.

This tape 34 is penetratingly provided therein with a plurality of rectangular openings 36 at suitable intervals in the longitudinal direction thereof. Extended through one of these rectangular openings 36 is the intermediate portion of the shoulder guide plate 22 covered by a bush 38. Consequently, the movement of this flexible tape 34 along the slide groove 30 in the longitudinal direction of the shoulder guide rail 26 causes the shoulder guide plate 22 to move in the longitudinal direction of the guide rail accordingly.

Figure 3:
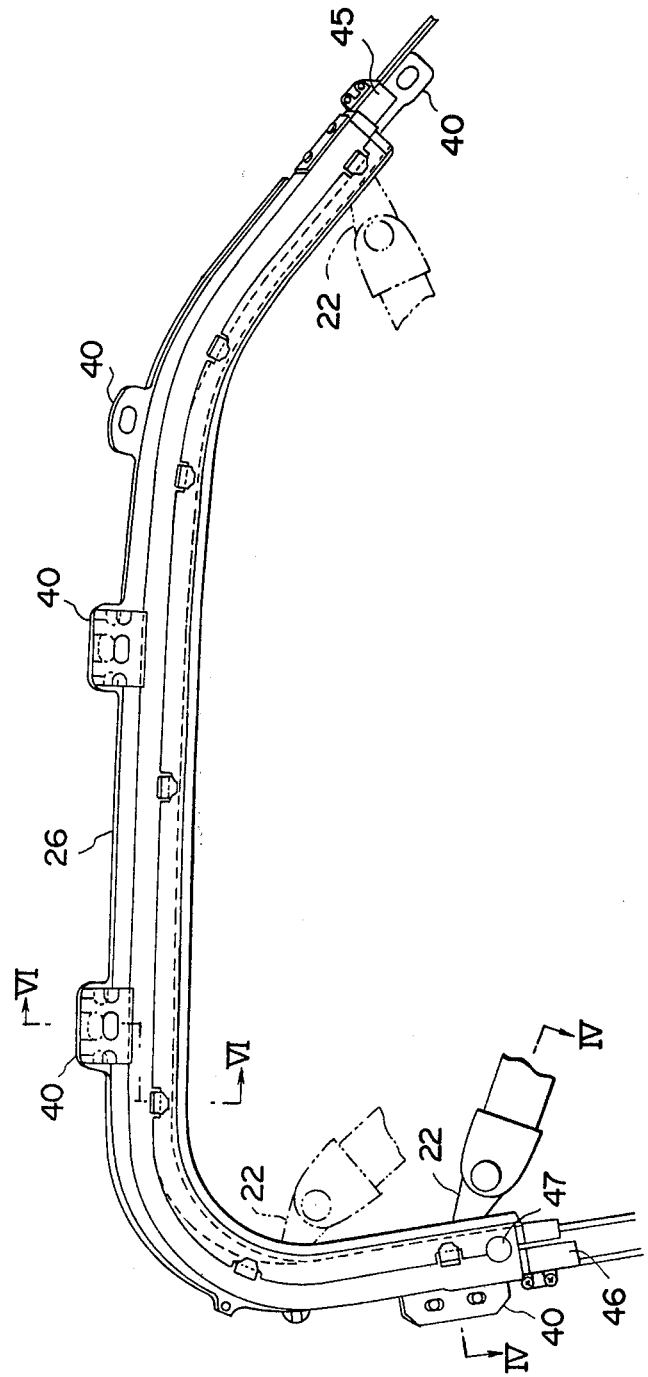
FIG. 3 is a front view showing the shoulder guide rail.

FIG. 3 is an enlarged front view showing the shoulder guide rail, in which the right side of the drawing indicates the front side of the vehicle and the left side thereof indicates the rear side of the vehicle. As shown in FIG. 3, the shoulder guide rail 26 is projectingly provided at suitable portions thereof with mounting brackets 40, through which the shoulder guide rail 26 is solidly secured to the roof side of the vehicle body, the forward end portion thereof (as viewed in the vehicle) descends along a front pillar 42 of the vehicle body as shown in FIG. 2, and the rear end portion thereof is bent substantially perpendicularly to the intermediate portion thereof and descends along a center pillar 44 of the vehicle body. Here, as indicated by solid lines in FIG. 3, when the shoulder guide plate 22 reaches the rear end of the guide rail 26, the position thus reached is a webbing fastening position for the occupant, and, when the shoulder guide plate 22 reaches the forward end, the position thus reached is a webbing unfastening position for the occupant. Limit switches 45 and 46 are provided at the forward and rear ends of the guide rail 26, respectively, and can detect the presence of the shoulde guide plate 22.

Figure 5:
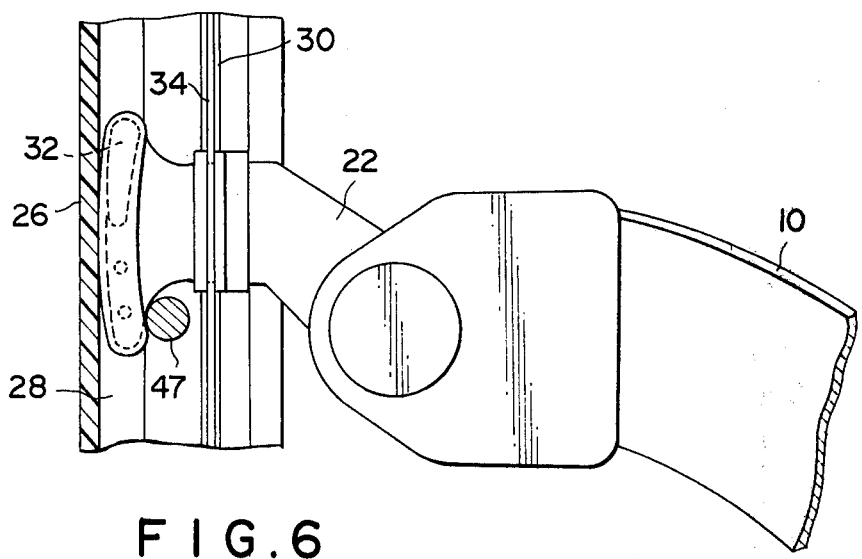
FIG. 5 is a sectional view taken along the line V—V in FIG. 4.

An anchor pin 47 (referring to FIG. 5) is solidly secured to a position adjacent the rear end of the shoulder guide rail 26 and adapted to engage with the enlarged head 32 of the guide plate, which has moved to the rear end portion of the vehicle.

Figure 8:
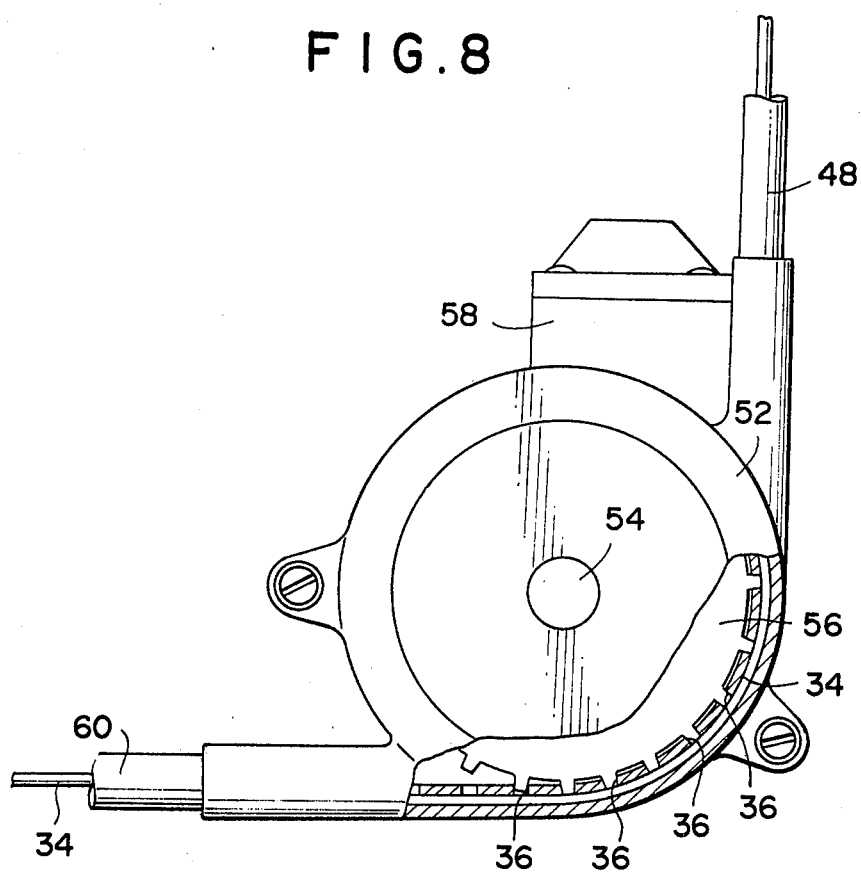
FIG. 8 is a partly broken away view showing the sprocket housing.

As shown in FIG. 2, a track 48 is connected to the rear end portion of the shoulder guide rail 26. This track 48 is provided therein with a guide channel rectangular in cross section slightly larger than the flexible tape 34 in cross-sectional area so as to guide the flexible tape 34 in a sliding condition, and the lower end portion thereof is communicated with a sprocket housing 52 solidly secured to the lower end of the interior of the center pillar 44. As shown in FIG. 8, fixed on a shaft 54 of this sprocket housing 52 is a sprocket wheel 56, which is engaged with the rectangular openings 36 of the flexible tape 34 being introduced through the track 48.

The spocket wheel 56 is driven by a single electric motor 58 to move the flexible tape 34 in the longitudinal direction thereof. In this embodiment, the motor 58 is adapted to rotate the sprocket wheel 56 in the clockwise direction in FIG. 8 during the occupant's entering the vehicle, or adapted to rotate the sprocket wheel 56 in the counterclockwise direction during the occupant's leaving the vehicle. For example, the motor 58 can be arranged to be actuated by a door switch (not shown) mounted between the door and the vehicle body.

Connected to the sprocket wheel 56 is another track 60 directed in the forward direction of the vehicle. This track 60 is disposed substantially perpendicularly to the track 48, i.e., disposed at the other side of the track 48 through the sprocket housing 52.

Figure 9:
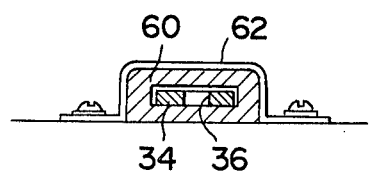
FIG. 9 is a sectional view taken along the line IX—IX in FIG. 2.
Figure 10:
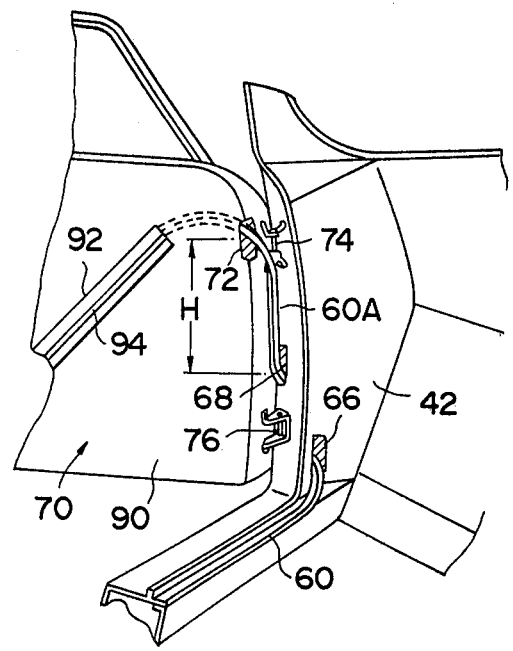
FIG. 10 is a perspective view showing the arrangement of the flexible tape, a door of a truck and a front pillar.

As shown in FIG. 9, this track 60 is secured at a suitable position thereof with brackets 62, through which the track 60 is engaged with the vehicle body. As shown in FIGS. 2 and 10, the intermediate portion of the track 60 is introduced into the front pillar 42 of the vehicle body through an opening 66, thereafter, led out of the front pillar 42 through an opening 68 of the front pillar 42, and led into a door 70 through an opening 72 of the door 70, which is penetrated at a position upward of the opening 68.

Figure 11:
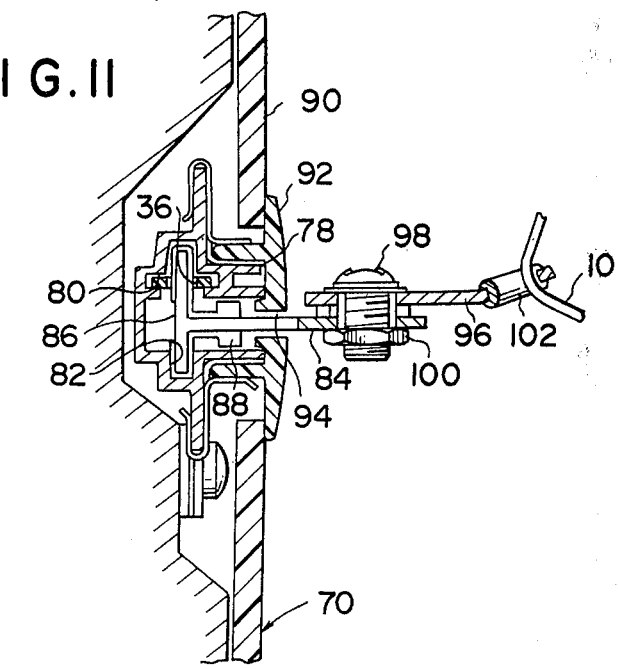
FIG. 11 is a sectional view taken along the line XI—XI in FIG. 1.

Here, a portion of the track 60 between the openings 68 and 72 is disposed between hinges 74 and 76 which rotatably support the door 70 on the front pillar 42, and forms a stepped portion 60A (The difference in height is 'H'). The longitudinal axis of this stepped portion 60A has a predetermined curvature so that a suitable deflection can be allowed between the openings 68 and 72 when the door is closed. In consequence, the stepped portion 60A compensates for a change in interval between the door 70 and the front pillar 42 during opening or closing of the door by varying the curvature thereof. Furthermore, the longitudinal axis of the intermediate portion of this stepped portion 60A is aligned with the rotary center of the door hinges 74 and 76, whereby, during opening or closing of the door, the stepped portion 60A may be twisted about the longitudinal axis thereof, thereby compensation for the change in interval between the door 70 and the front pillar 42. In either case, the flexible tape 34 in the track 60 can smoothly travel. The track 60 introduced into the door 70, as shown in FIG. 2, is connected to the forward end portion (as viewed in the vehicle) of a lap guide rail 78 solidly secured to the door. As shown in FIG. 11, this lap guide rail 78 is provided therein over the entire length thereof with a slide groove 80, in which slides the flexible tape 34 guided by the track 60. This lap guide rail 78 is also provided therein over the entire length thereof with a slide groove 82 perpendicularly intersecting the slide groove 80 and the slide groove 82 receives therein an enlarged head 86 of a lap guide member or lap guide plate 84. A portion of the enlarged head 86 is inserted through one of the rectangular opening 36 flexible tape 34, so as to move together with the flexible tape 34 along the lap guide rail 78.

This lap guide plate 84 is secured at the intermediate portion thereof with a shoe 88 which slides on the lap guide rail 78, and the forward end portion of the lap guide plate 84 projects to the inside of the vehicle through an opening 94 of a garnish 92 secured to a door trim 90.

A ring plate 96 is rotatably mounted on this lap guide plate 84 by means of a bolt 98 and a nut 100. The intermediate portion of the outer webbing 10 extends through a slot 102 of the ring plate 96, and the other end of the outer webbing 10, as shown in FIG. 1, is solidly secured to the lower rear portion of the door 70 through a lap anchor 104.

As shown in FIG. 2, the lap guide rail 78 is disposed from the lower rear portion to the upper forward portion of the door 70 in a straight-line arrangement or a curved-line arrangement with a suitable curvature, and when the lap guide plate 84 is moved forward in the vehicle by the longitudinal movement of the flexible tape 34, a portion of the outer webbing 10 between the ring plate 96 and the lap anchor 104 is brought into substantially close contact with the inner surface (as viewed from inside of the vehicle) of the door 70 as shown in a driver's seat in FIG. 1. Therefore, no interference may take place with legs of the occupant entering or leaving the vehicle. When this ring plate 96 moves rearward in the vehicle and stops at a position adjacent the lap anchor 104, the webbing fastening operation for the occupant is not hindered by the outer webbing 10 when the occupant closes the door upon being seated.

Figure 12:
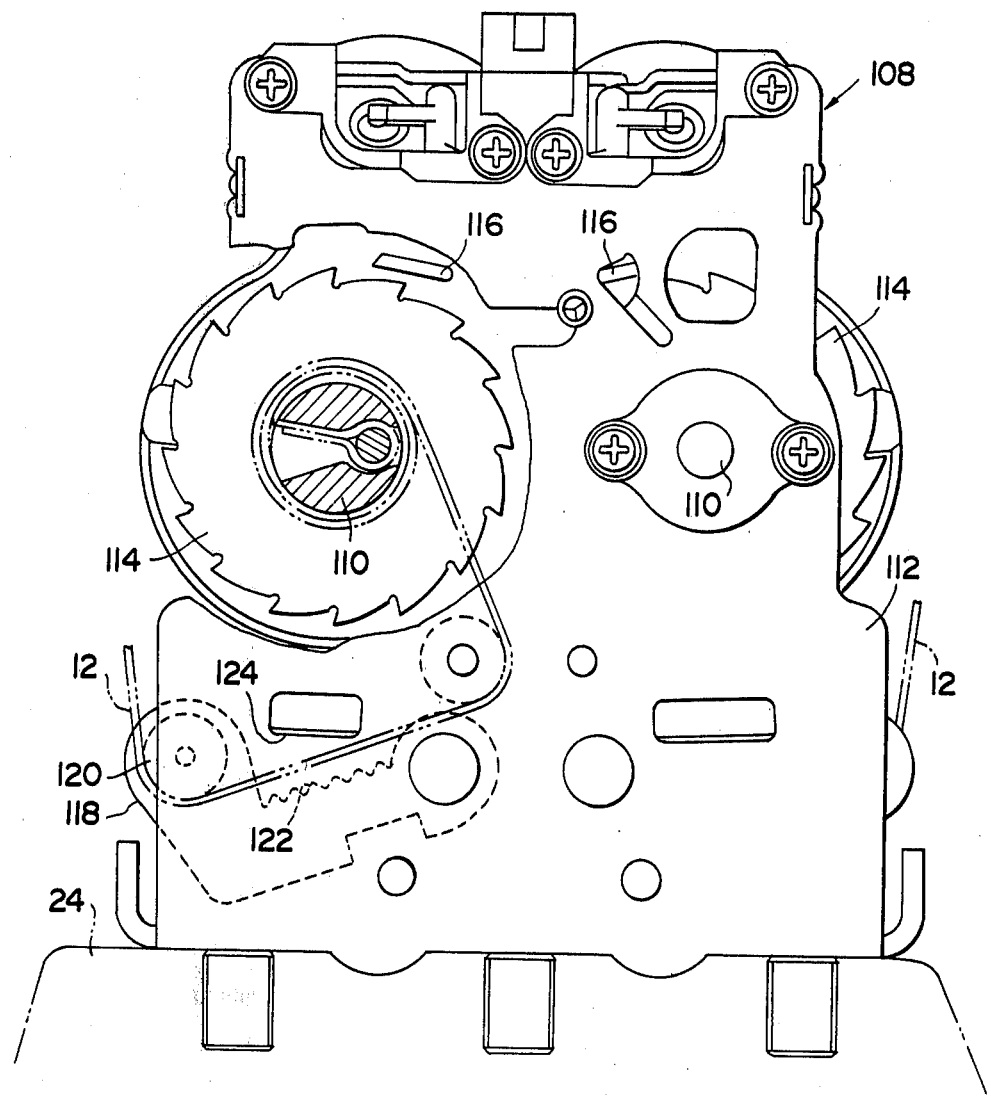
FIG. 12 is a front view showing the retractor.

As shown in FIG. 1, a through-ring 106 is provided at a portion of the outer webbing 10 between the ring plate 96 and the shoulder anchor 14, and movable in the longitudinal direction of the outer webbing 10. The forward end portion of the inner webbing 12 is engaged with this through-ring 106, and the base portion of the inner webbing 12 is wound around a takeup shaft 110 (referring to FIG. 12) of a retractor 108 secured to a floor substantially at the center of the vehicle.

Provided between this takeup shaft 110 and a frame 112 is a windup sprial spring, not shown, which is adapted to wind up the inner webbing 12 by a predetermined value of urging force.

Solidly secured to this takeup shaft 110 is a ratchet wheel 114, which is relatively opposed to a pawl 116 journalled on the frame 112. In an emergency of the vehicle, this pawl 116 is actuated by an acceleration sensor such as a pendulum, not shown, to engage with the ratchet wheel 114, so that the webbing windout rotation of the takeup shaft 110 is stopped. This ratchet wheel 114 and the pawl 116 constitute an inertia lock mechanism.

furthermore, in this retractor 108, a lever 118 is pivotally supported on the frame 112, and the intermediate portion of the inner webbing 12 is wound around a roller 120 of this lever 118. Consequently, when a tensile force of the inner webbing 12 increases in an emergency of the vehicle, this lever 118 rotates with respect to the frame 112, and wave-shaped ridges 122 provided at the intermediate portion of the lever 118 directly clamp the intermediate portion of the inner webbing 12 in cooperation with a block 124 solidly secured to the frame 112, whereby, in an emergency of the vehicle, the intermediate portion of the webbing 12 is quickly locked to prevent the webbing 12 from moving in the longitudinal direction thereof.

Description will now be given of operation of this embodiment with the above-described embodiment.

The driver's seat in FIG. 1 shows the state of the door 70 being opened for allowing the occupant to enter the vehicle, in which the shoulder guide plate 22 is at the forward end portion of the guide rail 26 and the lap guide plate 84 is at the forward end portion of the lap guide rail 78. Consequently, the outer webbing 10 as a whole has been moved forward in the vehicle and the portion of the outer webbing 10 between the through-ring 106 and the lap anchor 104 has been greatly flexed forward in the vehicle by the ring plate 96, so that the occupant can be easily seated on a seat 126.

When the occupant closes the door 70, the motor 58 is actuated by a door switch, etc., not shown, to rotate the sprocket wheel 56 in the clockwise direction in FIG. 8. By this means, when the shoulder guide plate 22 moves along the shoulder guide rail 26 rearward in the vehicle to reach a position indicated by solid lines in FIG. 3, the limit switch 46 comes into contact with the shoulder guide plate 22 to shut off current from a vehicle power source to the motor 58.

Due to the movement of the shoulder guide plate 22, the flexible tape 34 is pushed out of the sprocket housing 52 toward the track 60, and moves rearward of the vehicle along the lap guide rail 78 inside the door 70, with the result that the lap guide plate 84 is also moved rearward in the vehicle to reach a position adjacent to the lap anchor 104.

Due to the movements of the shoulder guide plate 22 and the lap guide plate 84 as described above, the inner webbing 12 is wound into the retractor 108, whereby the through-ring 106 approaches the retractor 108. Consequently, a portion of the outer webbing 10 between the through-ring 106 and the shoulder guide plate 22 constitutes a shoulder webbing, and a portion of the webbing between the through-ring 106 and the lap anchor 104 constitutes a lap webbing, whereby the seated occupant is automatically brought into a three-point webbing fastened state (referring to another seat next to the driver's seat shown in FIG. 1).

During normal running condition of the vehicle, the retractor 108 does not lock the inner webbing 12, so that the occupant can take a free posture. Whereas, when the vehicle is involved in an emergency such as a collision, the inertia lock mechanism in the retractor 108 operates to abruptly interrupt the windout of the inner webbing 12. Accordingly, the occupant is positively restrained by a three-point webbing fastened state, thereby securing the occupant safely.

In the emergency of the vehicle as described above, in the shoulder guide plate 22 connected with the shoulder anchor 14, since the enlarged head 32 thereof is positively received in the shoulder guide rail 26 and engaged with the pin 47 of the guide rail 26, and the rear end portion of the shoulder guide rail 26 is disposed in a vertical direction, the end portion of the shoulder webbing is safely supported on the vehicle body and will not move forward in the vehicle accidentally.

When the occupant leaves the vehicle and the door 70 is opened, the shoulder guide plate 22 and the lap guide plate 84 are brought back to the state shown by the driver's seat in FIG. 1 in the reverse order of the above-described steps, whereby the webbing fastened state for the occupant is automatically released, thus enabling the occupant to leave the vehicle without any interference.

In opening or closing the door described above, since the track 60 in which the flexible tape is guided has the stepped portion 60A at the intermediate portion thereof as shown in FIG. 10, a change in interval between the door 70 and the front pillar 42 may be compensated for by deflection of the stepped portion 60A, so that the movement of the flexible tape 34 in the track 60 is not interfered with.

Figure 13:
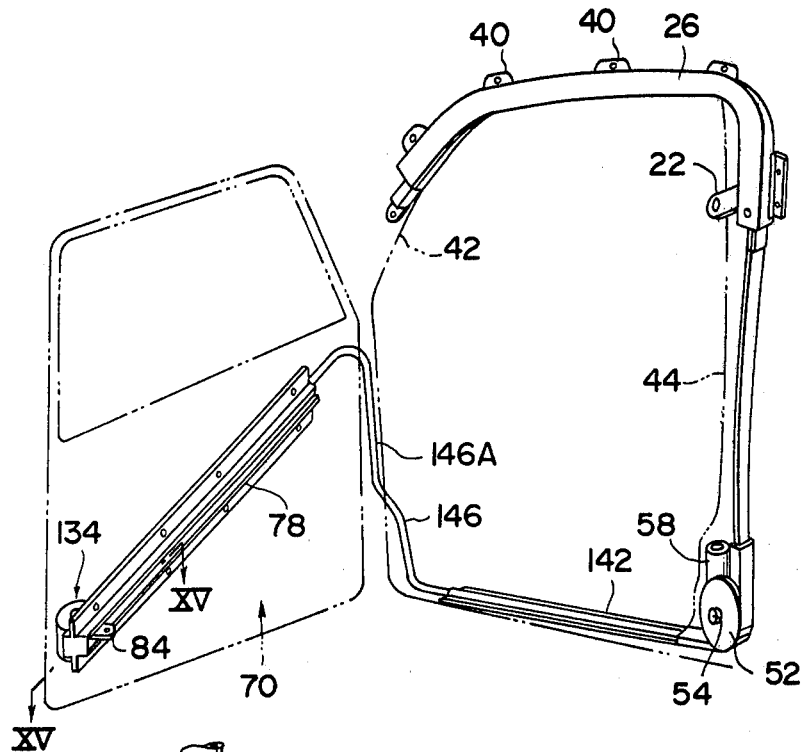
FIG. 13 is a perspective view corresponding to FIG. 2, showing a second embodiment of the present invention.

FIG. 13 shows a second embodiment of the present invention, in which a flexible wire 128 is provided between the flexible tape 34 and the lap guide plate 84.

Figure 14:
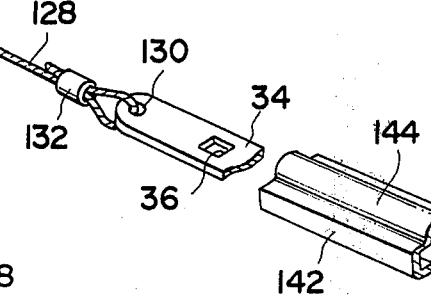
FIG. 14 is a perspective view showing the essential portions in a disassembled state of the second embodiment.
Figure 15:
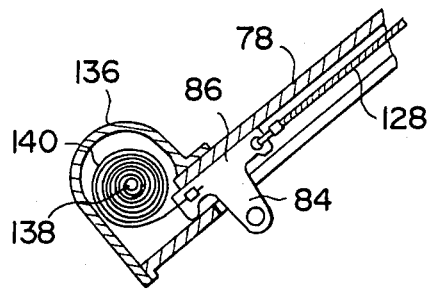
FIG. 15 is a sectional view taken along the line XV—XV in FIG. 13.

As shown in FIG. 14, this wire 128 extends through a round hole 130 formed at one end portion of the flexible tape 34, turning back thereat, and then, is fastened together with a ring 132. The other end of this wire 128 is also secured to the lap guide plate 84 in the lap guide rail 78 as shown in FIG. 15. Additionally, this lap guide plate 84 is constantly urged rearward in the vehicle by an urging device 134 with a spiral spring, which is provided at the rear end portion (as viewed in the vehicle) of the lap guide rail 78. In this urging device 134 with a spiral spring, an inner end of a constant tension spiral spring 140 is solidly secured to a shaft 138 of a spring case 136, and an outer end of this spiral spring 140 is engaged with the lap guide plate 84. This spiral spring 140 gives a substantially uniform urging force to the lap guide plate 84 no matter where the lap guide plate 84 is located in the lap guide rail 78.

Furthermore, in this embodiment, a track 142 extending forward in the vehicle and shorter than that in the preceding embodiment is connected to with sprocket housing 52. This track 142 has bulged-out portions 144 for smoothly moving the flexible wire 128. One end of a flexible wire cover 146 is connected to an end of this track 142 (a forward end in the vehicle) opposite the sprocket housing 52, and this wire cover 146 passes through the same moving path as that of the track 60 in the preceding embodiment and solidly secured to the forward end portion (as viewed in the vehicle) of the lap guide rail 78 so as to guide the wire 128 to the lap guide rail 78. A stepped portion 146A similar to that in the preceding embodiment is provided at the intermediate portion of the wire cover 146, whereby, during opening or closing of the door 70, the wire cover 146 and the flexible wire 128 are deflected to compensate for the relative movement between the door and the front pillar, while the flexible wire 128 is allowed to smoothly move.

In the second embodiment with the above-described arrangement, during opening of the door, a tensile force in the axial direction is generated by the driving force of the motor 58 in the flexible wire 128, whereby the lap guide plate 84 is moved forward in the vehicle, thereby placing the outer webbing forward in the vehicle. Upon closing the door, the motor is reversely driven, whereby the spiral spring 140 positively moves the lap guide plate 84 rearward of the vehicle by the driving force thereof, thereby automatically fastening the outer webbing about the occupant. In this embodiment, since the wire cover 146 has an annular cross section, the wire cover is easily assembled between the front pillar 42 and the door 70. Furthermore, the stepped portion 146A has less torsional resistance about the longitudinal axis thereof, thereby guiding the wire 128 more smoothly than that of the previous embodiment.

Figure 16:
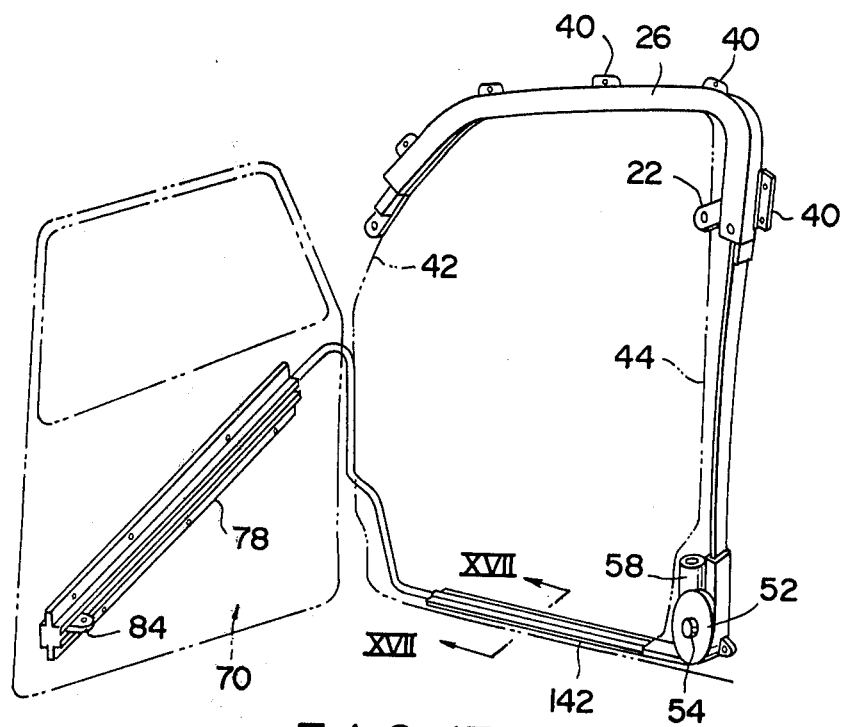
FIG. 16 is a perspective view showing the essential portions of a third embodiment of the present invention.
Figure 17:
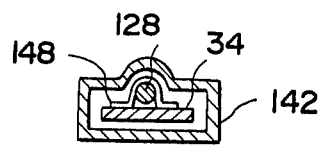
FIG. 17 is a sectional view taken along the line XVII—XVII in FIG. 16.
Figure 18:
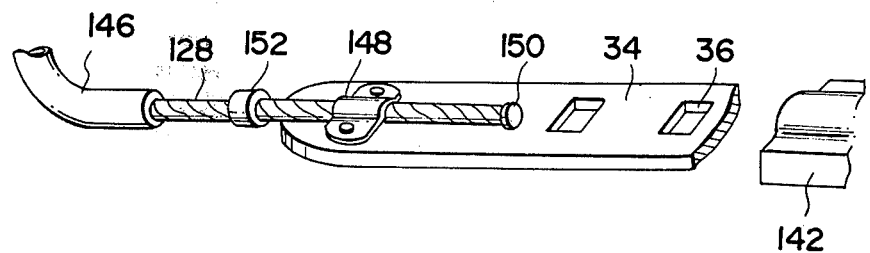
FIG. 18 is a perspective view, partly disassembled, of FIG. 16.

FIGS. 16 through 18 show a third embodiment of the present invention, in which consideration is given to the compensation for a difference in value of the movement when the required movement of the lap webbing differs from the required movement of the shoulder webbing. In FIG. 16, same reference numerals as shown in FIG. 13 are used to designate same or similar parts. As particularly shown in FIGS. 17 and 18, a bracket 148 having wire passing hole being substantially circular in cross section is solidly secured to an end portion of the flexible tape 34, while, a first stopper 150 is fixed to the forward end of the wire 128 and a second stopper 152 is solidly secured to the intermediate portion of the wire 128 at a position opposite to the first stopper 150 with respect to the bracket 148. Consequently, the wire 128 can relatively move with respect to the flexible tape 34 until either the stopper 150 and 152 comes into contact with the bracket 148.

Other parts of the third embodiment are similar to the aforesaid first embodiment, and in this embodiment, no such spiral spring which urges the flexible wire 128 as in the second embodiment is provided, instead, the rigidity of the flexible wire 128 against compression is designed to be high so that a compressive force in the longitudinal direction can be also transmitted.

Consequently, in this embodiment, when the door is opened, the flexible tape 34 is moved by the motor in a direction of being separated from the sprocket housing, the wire 128 is not moved until the bracket 148 abuts against the first stopper 150, and, after the bracket 148 abuts against the first stopper 150, the wire 128 is pulled by the tape 34 to be moved.

Conversely, when the door is closd, the wire is not moved until the bracket 148 abuts against the second stopper 152, and, after the bracket 148 abuts against the second stopper 152, the wire 128 is subjected to a compressive force in the longitudinal direction and is pushed by the tape 34 because this wire 128 is high in rigidity against compression. As a result, the shoulder webbing can be made smaller in the value of movement than the lap webbing, and when the flexible tape is driven by a single sprocket to move the shoulder webbing and the lap webbing at the same time, the strokes of both webbings can be varied from each other.

Figure 19:
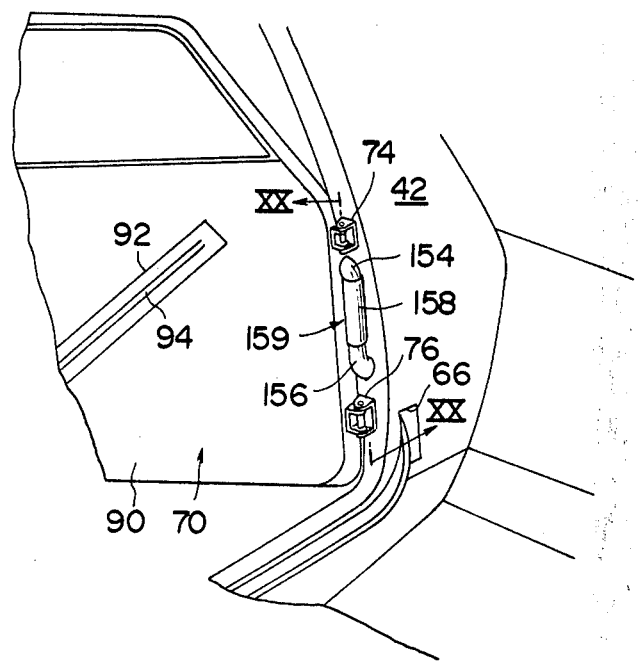
FIG. 19 is a perspective view showing a fourth embodiment of the present invention.
Figure 20:
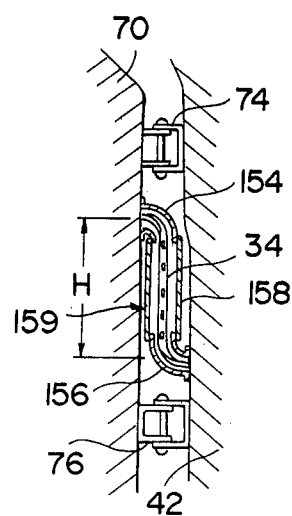
FIG. 20 is a sectional view taken along the line XX—XX in FIG. 19.

FIGS. 19 and 20 show a fourth embodiment of the present invention, in which a stepped portion 159 between the door and the front pillar of the vehicle body comprises round guide members 154 and 156 and a linear guide member 158.

The round guide member 154 is a 90° bent pipe-shaped guide member, one end of which is secured to the front end of the door 70. The round guide member 156 is also a 90° bent pipe-shaped guide member, one end of which is secured to the front pillar 42 of the vehicle body. Both other ends of the round guide members 154 and 156 are disposed so that both axes of the members 154 and 156 are aligned with each other vertically, and the linear guide member 158 is loosely coupled with both round guide members 154 and 156 in between.

The linear guide member 158 is disposed so that the axis thereof is aligned in the rotation center of the door hinges 74 and 76. Therefore, while the linear guide member 158 relatively rotates with respect to the round guide members 14 and 156 during closing or opening of the door, the rotation center of the linear guide member 158 is always aligned in that of the door hinges 74 and 76. Stored within the guide members 154, 156 and 158 is the flexible tape 34 extending between the front pillar 42 and the door 70, which moves in the longitudinal direction thereof by the driving force from the motor so as to transmit the driving force from the vehicle body side to the door side. Other features of the fourth embodiment are similar to that of the first embodiment.

In operation, like previous embodiments the occupant is automatically brought into a three-point webbing fastened state upon seating on the seat and closing the door. Particularly in this embodiment, since the axis of the stepped portion 159 is aligned in the rotation center of the door hinges, the flexible tape 34 is twisted around the longitudinal axis thereof, thereby absorbing the change of distance between the door and front pillar.

Figure 21:
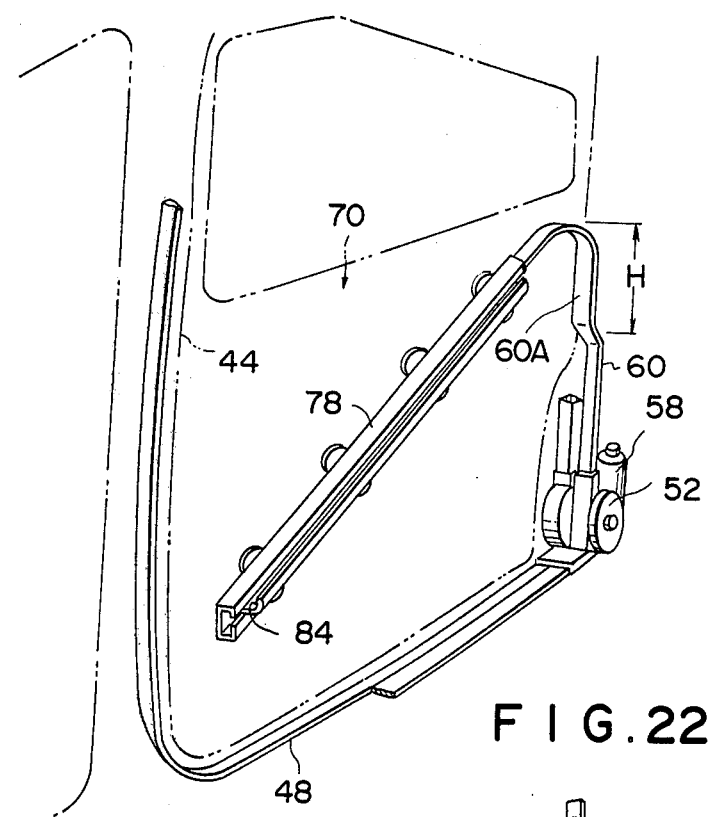
FIG. 21 is a perspective view showing a fifth embodiment of the present invention.
Figure 22:
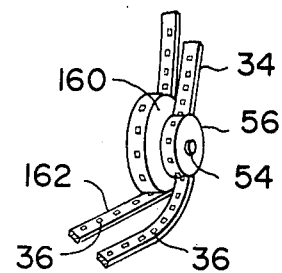
FIG. 22 is a partial perspective view showing sprocket wheels of the fifth embodiment.

FIGS. 21 and 22 show a fifth embodiment of the present invention. In the fifth embodiment, where the track 60 has the stepped portion 60A between the door and front pillar as stated in the first embodiment, the track 60 is connected with sprocket housing 52 provided at the lower portion of the front pillar 42. As shown in FIG. 22, a second sprocket wheel 160 having a larger diameter than that of the sprocket wheel 56 is co-axially fixed to the sprocket wheel 56. Meshed with the second sprocket wheel 160 is a second flexible tape 162, the other end of which is, like the first embodiment, connected with the shoulder guide rail for guiding shoulder webbing through the track 48.

In operation, therefore, the single motor simultaneously moves both the lap and shoulder webbings through the flexible tapes 34 and 162 and the stepped portion 60A of the track 60 compensates for the relative movement of the door and the vehicle body.

As has been described above, in the automatically fastening seatbelt system according to the present invention, forces for driving the shoulder webbing and the lap webbing are transmitted from opposite end portions of the flexible tape meshed with the sprocket wheel driven by the motor, thereby offering an outstanding advantage that the shoulder webbing and the lap webbing can be moved by a single motor.

What is claimed is:

1. An automatic seatbelt system, comprising:
   a first guide rail mounted along a roof side of a vehicle body for guiding a shoulder guide plate;
   a second guide rail mounted on a vehicle door for guiding a lap guide plate;
   an outer seatbelt having a first end secured to said shoulder guide plate and a second end secured to a lower rear corner of said vehicle door;
   an inner seatbelt having a first end slidably connected with an intermediate portion of said outer seatbelt and a second end secured on a takeup shaft of a retractor mounted on a center portion of a vehicle floor;
   a ring plate mounted on said lap guide plate and slidably connected with the intermediate portion of said outer seatbelt between said first end of the inner seatbelt and said second end of the outer seatbelt;
   a flexible transmitting means having a first end coupled with said shoulder guide plate and a second end coupled with said lap guide plate; and
   a driving means for driving said flexible transmitting means along said first and second guide rails.

2. An automatic seatbelt system as set forth in claim 1, wherein said flexible transmitting means extends continuously between the vehicle body and vehicle door and has a stepped portion substantially extending in a vertical direction between the vehicle body and the vehicle door.

3. An automatic seatbelt system as set forth in claim 2, wherein an axis of said stepped portion is aligned in a portion of an axis of door hinges adapted for rotatably supporting the vehicle door on the vehicle body.

4. An automatic seatbelt system as set forth in claim 1, further comprising a spring mounted on a rear end of said second guide rail for urging said lap guide plate rearwardly.

5. An automatic seatbelt system as set forth in claim 1, wherein said driving means is a reversibly rotatable sprocket wheel located on a lower rear corner of a door opening portion of said vehicle body.

6. An automatic seatbelt system as set forth in claim 5, further comprising a track for slidably storing said transmitting means located along a lower horizontal portion of said door opening portion.

7. An automatic seatbelt system as set forth in claim 6, further comprising a guide means for slidably storing said transmitting means located between a front vertical portion of said door opening portion and a front vertical portion of said door.

8. An automatic seatbelt system as set forth in claim 7, wherein said transmitting means comprises:
   a flexible tape having one end defining said first end of said transmitting means coupled with said shoulder guide plate and a plurality of openings along a longitudinal direction of said tape to be meshed with said sprocket wheel; and
   a flexible wire having one end defining said second end of said transmitting means coupled with said lap guide plate and a second end connected to a second end of said flexible tape.

9. An automatic seatbelt system as set forth in claim 8, wherein said second end of said flexible wire is longitudinally relatively movable with respect to said second end of said flexible tape within a predetermined range.

10. An automatic seatbelt system as set forth in claim 8, wherein said guide means comprises:
    a pair of tubular guide members bent 90°, one end of each of which is secured to the door and to the vehicle body, respectively; and
    a linear tubular guide member loosely coupled with and between said bent guide members.

11. An automatic seatbelt system as set forth in claim 10, wherein an axis of said linear guide member is aligned in a rotation axis of door hinges adapted for rotatably supporting the vehicle door on the vehicle body.

12. An automatic seatbelt system as set forth in claim 11, further comprising a flexible wire cover for slidably storing said wire and having portions defining said pair of bent guide members and said linear guide member.

13. An automatic seatbelt system, comprising:
    a first guide rail mounted along a roof side of a vehicle body and guiding a shoulder guide plate;
    a second guide rail mounted on a vehicle door and guiding a lap guide plate;
    an outer seatbelt having a first end secured to said shoulder guide plate and a second end secured to a lower rear corner of said vehicle door;
    an inner seatbelt having a first end slidably connected with the intermediate portion of said outer seatbelt and a second end secured on a takeup shaft of a retractor mounted on a center portion of a vehicle floor;
    a ring plate mounted on said lap guide plate and slidably connected with an intermediate portion of said outer seatbelt between said first end of the inner seatbelt and said second end of the outer seatbelt;
    a first transmitting means having one end coupled with said shoulder guide plate and a second free end;

a second transmitting means connected to said first transmitting means and having one end coupled with said lap guide plate and a second free end; and a driving means for driving said first and second transmitting means, said driving means having a first reversibly rotatable sprocket wheel engaging said first transmitting means and a second reversibly rotatable sprocket wheel engaging said second transmitting means.

14. An automatic seatbelt system as set forth in claim 13, wherein said first sprocket wheel has a smaller diameter than said second sprocket wheel and said sprocket wheels are coaxially rotatable.

15. An automatic seatbelt system as set forth in claim 14, further comprising a track for slidably storing said transmitting means located along a lower horizontal portion of a door opening portion of the vehicle.

16. An automatic seatbelt system as set forth in claim 15, further comprising a guide means for slidably storing said transmitting means located between a front vehicle portion of said door opening portion and a front vehicle portion of said door.

17. An automatic seatbelt system as set forth in claim 16, wherein said guide means comprises:

a pair of tubular guide members bent 90°; one end of each of which is secured to the door and to the vehicle body, respectively; and a linear tubular guide member loosely coupled with and between said bent guide members.

18. An automatic seatbelt system as set forth in claim 17, wherein an axis of said linear guide member is aligned in a rotation axis of door hinges adapted for rotatably supporting the vehicle door on the vehicle body.

19. An automatic seatbelt system as set forth in claim 18, wherein said first and second transmitting means have a plurality of openings along the longitudinal direction thereof, respectively.

20. An automatic seatbelt system as set forth in claim 19, further comprising a spring mounted on a rear end of said second guide rail which urges said lap guide plate rearwardly.

21. An automatic seatbelt system comprising:

a first guide rail mounted along a roof side of a vehicle body and guiding a shoulder guide plate;

a second guide rail mounted on a vehicle door and guiding a lap guide plate;

an outer seatbelt having a first end secured to said shoulder guide plate and a second end secured to a lower rear corner of said vehicle door;

an inner seatbelt having a first end slidably connected with an intermediate portion of said outer seatbelt and a second end secured on a takeup shaft of a retractor mounted on a center portion of a vehicle floor;

a ring plate mounted on said lap guide plate and slidably connected with the intermediate portion of said outer seatbelt between said first end of the inner seatbelt and said second end of the outer seatbelt;

a spring mounted on a rear end of said second guide rail and urging said lap guide plate rearwardly;

a flexible transmitting means comprising:

a flexible tape having a first end coupled with said shoulder guide plate and a plurality of openings along the longitudinal direction of said tape; and a flexible wire having a first end connected to a second end of said flexible tape and a second end coupled with said lap guide plate;

a reversibly rotatable sprocket wheel engaged with said openings of said tape to drive said tape and said wire along said first and second guide rails, said sprocket wheel being located on a lower rear corner of a door opening portion of said vehicle;

a track for slidably storing said transmitting means located along a lower horizontal portion of said door opening; and a guide means for slidably storing said transmitting means located between a front vertical portion of said door opening portion and a front vertical portion of said door, said guide means comprising:

a pair of tubular guide members bent 90°, one end of each of which is secured to the door and to the vehicle body, respectively; and a linear tubular guide member loosely coupled with and between said bent guide members, an axis of said linear guide member being aligned in a rotation axis of door hinges adapted for rotatably supporting the vehicle door on the vehicle body.

* * * * *